United States Patent
Haynes et al.

(10) Patent No.: US 10,466,051 B2
(45) Date of Patent: Nov. 5, 2019

(54) SPORTING FIELD MEASUREMENT SYSTEM

(71) Applicants: Lee Edward Haynes, DeSoto, TX (US); Byron Lee Robinson, Garland, TX (US)

(72) Inventors: Lee Edward Haynes, DeSoto, TX (US); Byron Lee Robinson, Garland, TX (US)

( * ) Notice: Subject to any disclaimer, the term of this patent is extended or adjusted under 35 U.S.C. 154(b) by 114 days.

(21) Appl. No.: 15/861,416

(22) Filed: Jan. 3, 2018

(65) Prior Publication Data
US 2019/0025055 A1 Jan. 24, 2019

Related U.S. Application Data

(60) Provisional application No. 62/441,851, filed on Jan. 3, 2017.

(51) Int. Cl.
| | |
|---|---|
| *G01C 15/06* | (2006.01) |
| *A63C 19/08* | (2006.01) |
| *G01C 15/04* | (2006.01) |
| G06F 3/0482 | (2013.01) |
| G01C 15/00 | (2006.01) |

(52) U.S. Cl.
CPC ............. *G01C 15/06* (2013.01); *A63C 19/08* (2013.01); *G01C 15/04* (2013.01); *G01C 15/004* (2013.01); *G06F 3/0482* (2013.01)

(58) Field of Classification Search
CPC ...................................................... G01C 15/06
USPC ........................................... 33/1 G, 289, 294
See application file for complete search history.

(56) References Cited

U.S. PATENT DOCUMENTS

| | | | | |
|---|---|---|---|---|
| 3,752,588 | A * | 8/1973 | Chapman ........... | A63B 71/0605 356/141.1 |
| 6,778,283 | B2 * | 8/2004 | Lee ..................... | A63B 71/0605 33/289 |
| 6,907,840 | B1 * | 6/2005 | Gaines ............... | A63B 71/0605 116/222 |
| 7,185,439 | B1 * | 3/2007 | Nubin ....................... | G01S 5/02 33/289 |
| 8,690,715 | B2 * | 4/2014 | Vogt ..................... | A63C 19/065 33/289 |
| 9,433,849 | B1 * | 9/2016 | Brown ............... | A63B 71/0605 |

(Continued)

*Primary Examiner* — George B Bennett
(74) *Attorney, Agent, or Firm* — MU P.C.

(57) ABSTRACT

A sporting field measurement system is disclosed wherein a user is prompted to select, on a mobile device, a field for marking from various sporting field types including, but not limited to football, baseball, softball, soccer, lacrosse, track, tennis, basketball, cricket, polo, rugby, Australian football, volleyball, and badminton. The Global National Satellite System (GNSS) or at least the global positioning system (GPS) is used to locate a user's device. An application displays, on a display, of the mobile device, the dimensions of the specified sporting field as an overlay on a map, generated by the positioning system and it will communicate with the GNSS or GPS of the device to allow the user to track his or her movement along a specified path of a proposed field. This will allow the user to place the appropriate markers and/or paint the field. Deviations from the path may be indicated on the display of the mobile device or by an audio indication generated by the mobile device.

20 Claims, 8 Drawing Sheets

(56) References Cited

U.S. PATENT DOCUMENTS

| | | | | |
|---|---|---|---|---|
| 2004/0111903 A1* | 6/2004 | Amron | ............... | G01C 15/004 33/289 |
| 2004/0111905 A1* | 6/2004 | Amron | ............... | G01C 15/004 33/289 |
| 2004/0200082 A1* | 10/2004 | Dinicola | ............. | G01C 15/004 33/289 |
| 2005/0183273 A1* | 8/2005 | Amron | ............... | G01C 15/004 33/289 |
| 2007/0062053 A1* | 3/2007 | Walser | ................. | A63C 19/06 33/286 |

* cited by examiner

SPORTING FIELD MEASUREMENT SYSTEM

CROSS-REFERENCE TO RELATED APPLICATIONS

The present application claims priority to U.S. Provisional Patent Application No. 62/441,851 filed on 1 Jan. 2017, entitled "Sporting Field Measurement System," the entire disclosure of which is incorporated by reference herein.

BACKGROUND OF THE INVENTION

1. Field of Invention

The present invention relates to a system to accurately measure sporting fields, and more particularly to a software application system to accurately measure out the dimensions of a sporting field.

2. Description of Related Art

Proper set up of a sporting field involves careful measurement, tracking, and precise geometry across long distances. Multiple measuring tools, markers, and persons may be necessary to ensure the field is marked with the correct dimensions and meet regulations. Sporting fields often require multiple circles with correct radii to be marked out, and multiple right angles to be marked correctly. Misalignment of one corner or portion could cause the entire field to be skewed.

Further, persons marking the field must know the proper dimensions for the field they are planning to set up. Each field must be properly dimensioned for the sport to be played upon it. Additionally, the dimensions of the field may vary for a particular sport, depending on the level of play. For instance, a Major League Baseball (MLB) field has bases which are 90 feet apart, while the bases of a little league field are 60 feet apart. It may be difficult for persons marking lines on a field to recall exact dimensions, especially if they deal with marking lines on various types of sporting fields.

While technology has certainly advanced since the standards of sports field dimensions were set, there has been little done to use the technological resources available to aid in marking most sporting fields. Most fields are still marked using traditional methods and manual measurement tools. The hassle involved with correctly setting up a sports field may leave many to forego the process for temporary or one-time sporting events.

Based on the foregoing, there is a need in the art for a system which uses computer software to aid in measuring and marking various sized sports fields. Additionally desired is a system which uses the Global National Satellite System (GNSS) or at least the global positioning system (GPS) to assist persons in quickly and accurately setting up a sports field.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
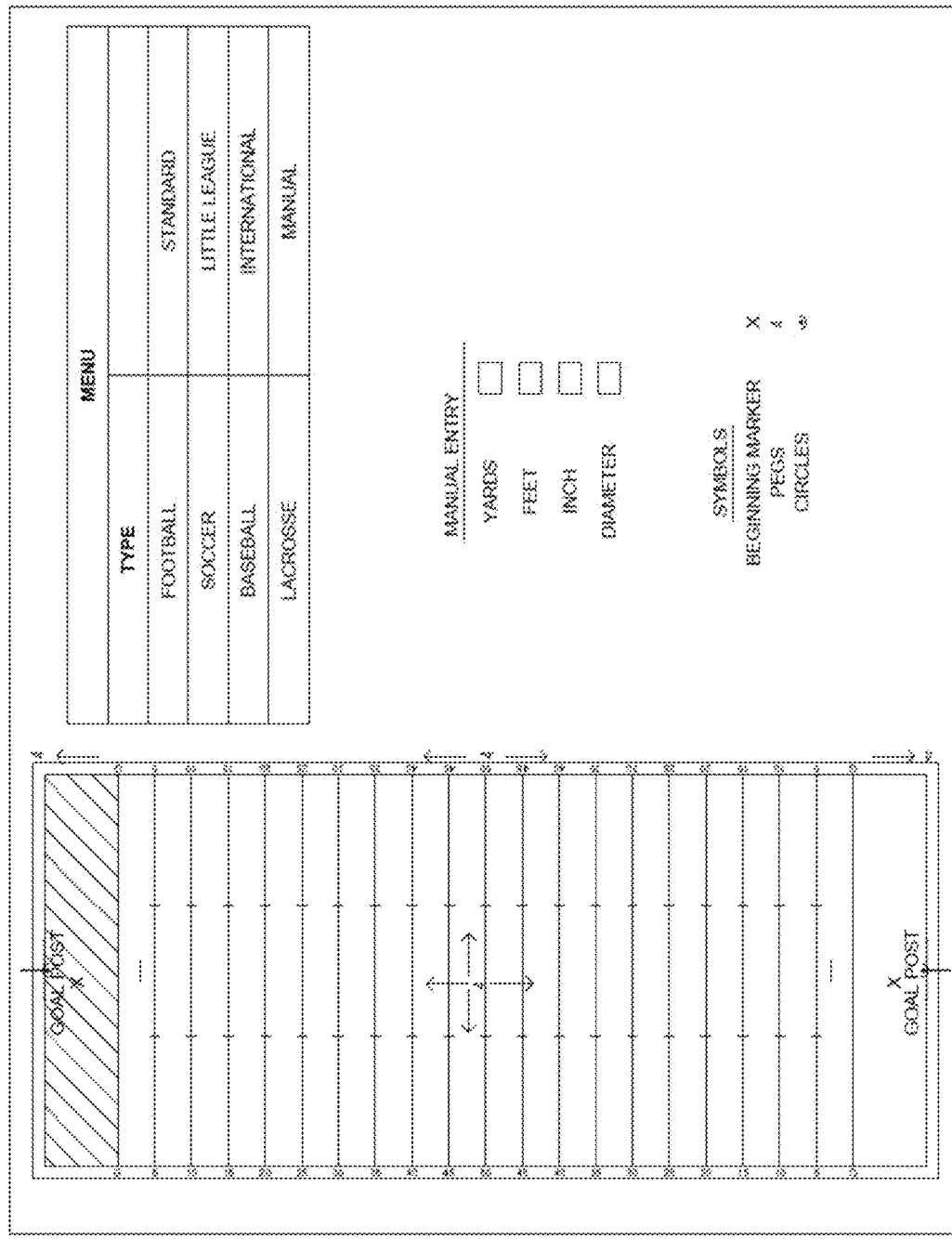
FIG. 1 is an illustration of a sporting field displayed on a user device, according to an embodiment of the present invention.

Embodiments of the present invention and their advantages may be understood by referring to FIGS. 1-8, wherein like reference numerals refer to like elements.

A sporting field measurement system is disclosed herein. In one embodiment, a user downloads a software application to his/her mobile device. Upon opening the application for the first time, the user is prompted to allow the application access to the Global National Satellite System (GNSS) or at least the global positioning system (GPS) location feature of the user's device. Once the application has access to the location feature of the user's device, the user is able to select from various sporting field types. The types of sporting fields a user may select from include, but are not limited to football, baseball, softball, soccer, lacrosse, track, tennis, basketball, cricket, polo, rugby, Australian football, volleyball, badminton and other sports.

In some embodiments, the application is then paired with one or more coordinate pegs or markers. The user places a first peg in the ground (this will serve as a starting point), and associates the peg with a feature of the sporting field. The application, then maps out the dimensions of the specified sporting field from the paired peg on the user's device as a virtual field. In some embodiments, the application will communicate with the GNSS or GPS of the device to allow the user to track his or her movement so the user may locate his/her position within the dimensions of the proposed field. This will allow the user to place the appropriate markers and/or paint the field without using multiple tools or measuring equipment. In one embodiment, water paints may be used in place of the pegs or markers, as known in the art.

In other embodiments, the software application includes a field leveling function. In these embodiments, the software application utilizes the GNSS/GPS system of the user's device to function as an altimeter. A user may activate the field leveling function by placing his/her device on the ground, or by placing his/her device a measured distance from the ground at any point on the sporting field and setting a reference height. After the reference height is set, the user may travel across the field and the software application will display the deviation in height from the reference height.

FIG. 1, is an illustration of one possibility displayed on a user's mobile device as he/she uses the tracking feature to locate his/her position within the dimensions of a proposed sports field. In one embodiment, an active map 10 of the field is displayed with a key 20 provided for a user to reference markers, pegs, and circles. In this embodiment, the display is further provided with a menu 30 to allow a user to select different field dimensions and systems of units to be displayed.

In one embodiment, the software application will present a real-time marker for the user's position relative to the proposed field. The application will further provide the user with an exact distance from the coordinate peg or marker. In an embodiment, the software application on the user's device will produce a continuous beep if a user is off from the specified dimensions or markers of the field. In another embodiment, a beep or specific tone will notify a user when he/she is standing on a specific marker or feature of the field.

Figure 2:
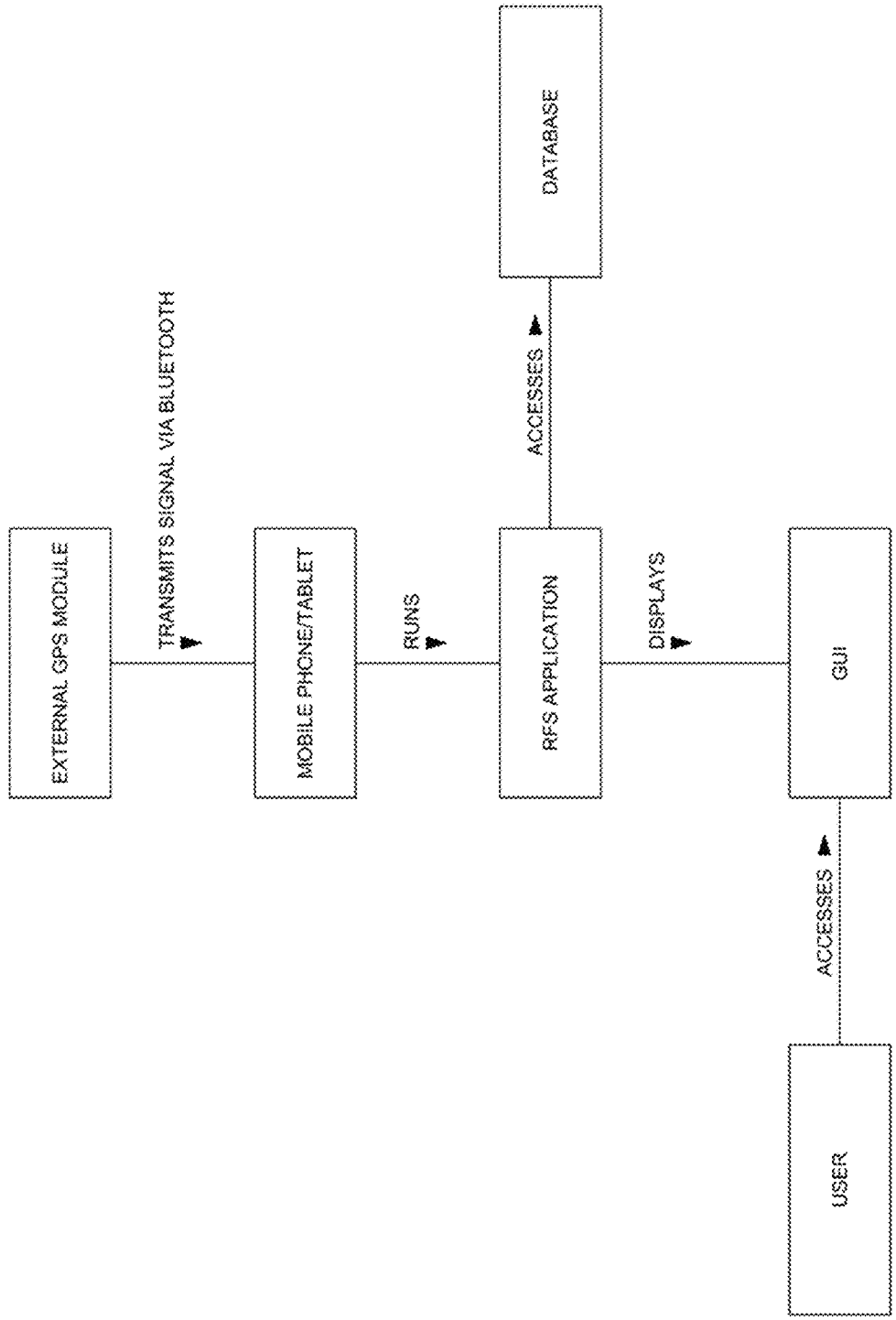
FIG. 2 is a diagram illustrating a functional layout of the recreational field surveyor system.

FIG. 2 is a diagram illustrating a functional layout of the recreational field surveyor system. A GNSS/GPS module with GNSS/GPS navigation functionality may be internal to a mobile communication device such as a mobile phone or tablet. Alternatively, it may be external to the mobile device while supplying GNSS/GPS-related data to the mobile device. A recreational field surveyor (RFS) application may run on the mobile device. The RFS application has access to a database which may be accessed locally or which may be accessed remotely for the case where the database is located on a remote server, etc. Users may interact with the RFS application using a graphical user interface (GUI). In one embodiment, the RFS allows users to register and login with a username (e.g., e-mail address) and password in order to access historic information stored in connection with a "History" feature. Users are able to log dimensions and access logged information in the History as contained in the database. In one embodiment, users may choose from a drop down list of up to 14 different types of sports fields (e.g. tennis courts, soccer fields, volleyball courts, football fields, etc.). Additionally, a user may select a standard dimension field or the user may input his/her own dimension for a field. Standard dimensions are stored in the database and any custom dimensions inputted by a user may also be stored in the database for future reference and access.

The RFS application will cause the display on the GUI to show a simulated layout of a recreational field chosen by the user. The layout will account for any obstacles on the field that need to be taken into account before marking the field. Once the chosen field is shown on the display, superimposed over the map drawing provided by the GPS application, the user may choose the starting point for the field on the layout.

Figure 3:
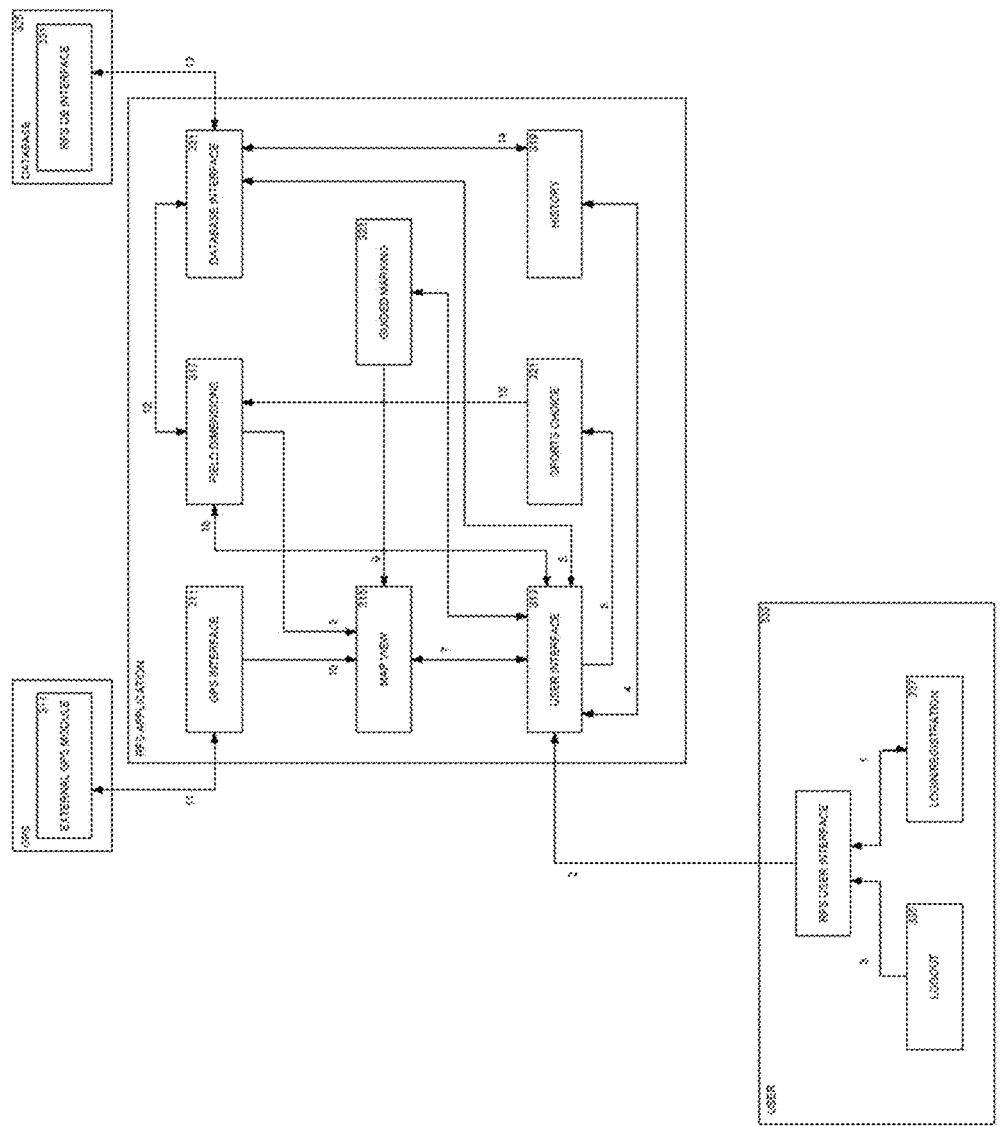
FIG. 3 illustrates a system diagram showing the recreational field surveyor (RFS) application and its access to various systems, interfaces and data.

FIG. 3 illustrates a system diagram showing the RFS application and its access to various systems, subsystems, interfaces and data. This access includes a GNSS/GPS interface 311, user interface 313, a map view 315, field dimensions 317, History 319, sports field choice information 321, guided marking information 323 and database information 325. GNSS/GPS Interface 311 provides an interface between the RFS application and a GNSS/GPS system 327. Database 325 interfaces with the RFS application through interface 331. A user 333 interfaces with the RFS application at interface 313. User login and logout are represented at blocks 335 and 337 respectively.

Figure 4:
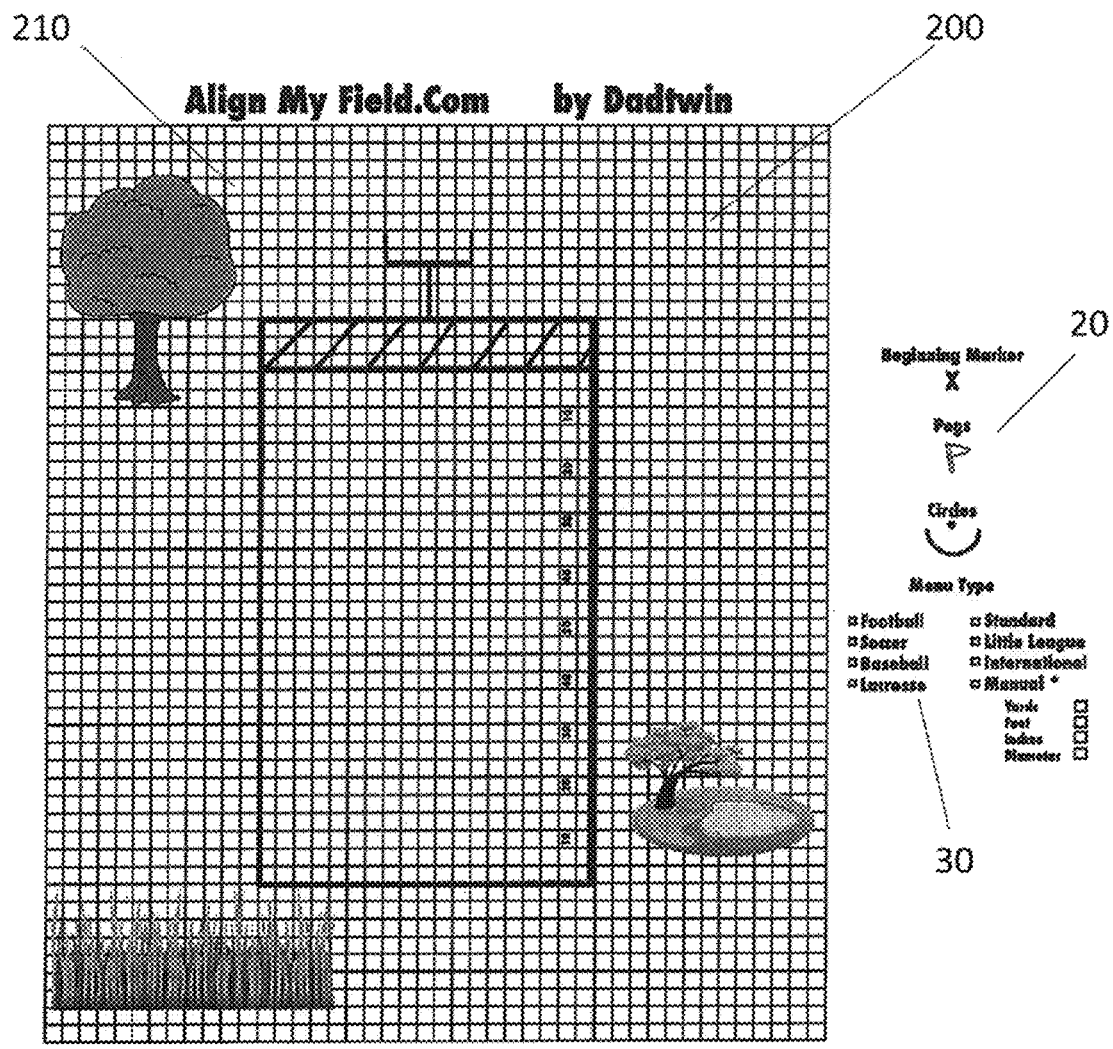
FIG. 4 is an illustration of an example of displayed information on a user's mobile device display as he/she uses a field layout feature.

FIG. 4 is an illustration of a possible image on the display of a user's mobile device as he/she uses a field layout feature. In the embodiment, a field 200 is projected upon a map 210. The map may be provided by Google Maps™ or another service in which allows a satellite image to be displayed on a user's device. When the field layout feature is active, key 20 and menu 30 may also be displayed.

After a user has positioned himself/herself, the RFS application may provide real-time dimension marking assistance for laying out an entire field by providing notification of deviations from the marking positions (including boundary positions, field lines, circles, etc.) and placing markers. More specifically, as a user travels, the RFS application may display a green arrow on the overlay as long as the path is along the appropriate field marker. One or more red arrows may be displayed in connection with a user deviating from the displayed layout. Alternatively, or in addition thereto, deviations in movement in accordance with the displayed layout may be accompanied with an audible siren or warning sound as generated by the mobile device. The marking assistance may be synchronized, so as to be relevant only with marker deployment, with the use of a marker wand or striping machine. Depending upon the field parameters and the sport field itself, the RFS application will notify the user to drop pegs/draw marking at appropriated times. Once the entire field is marked, the RFS application will alert the user that field marking has been completed.

Figure 5:
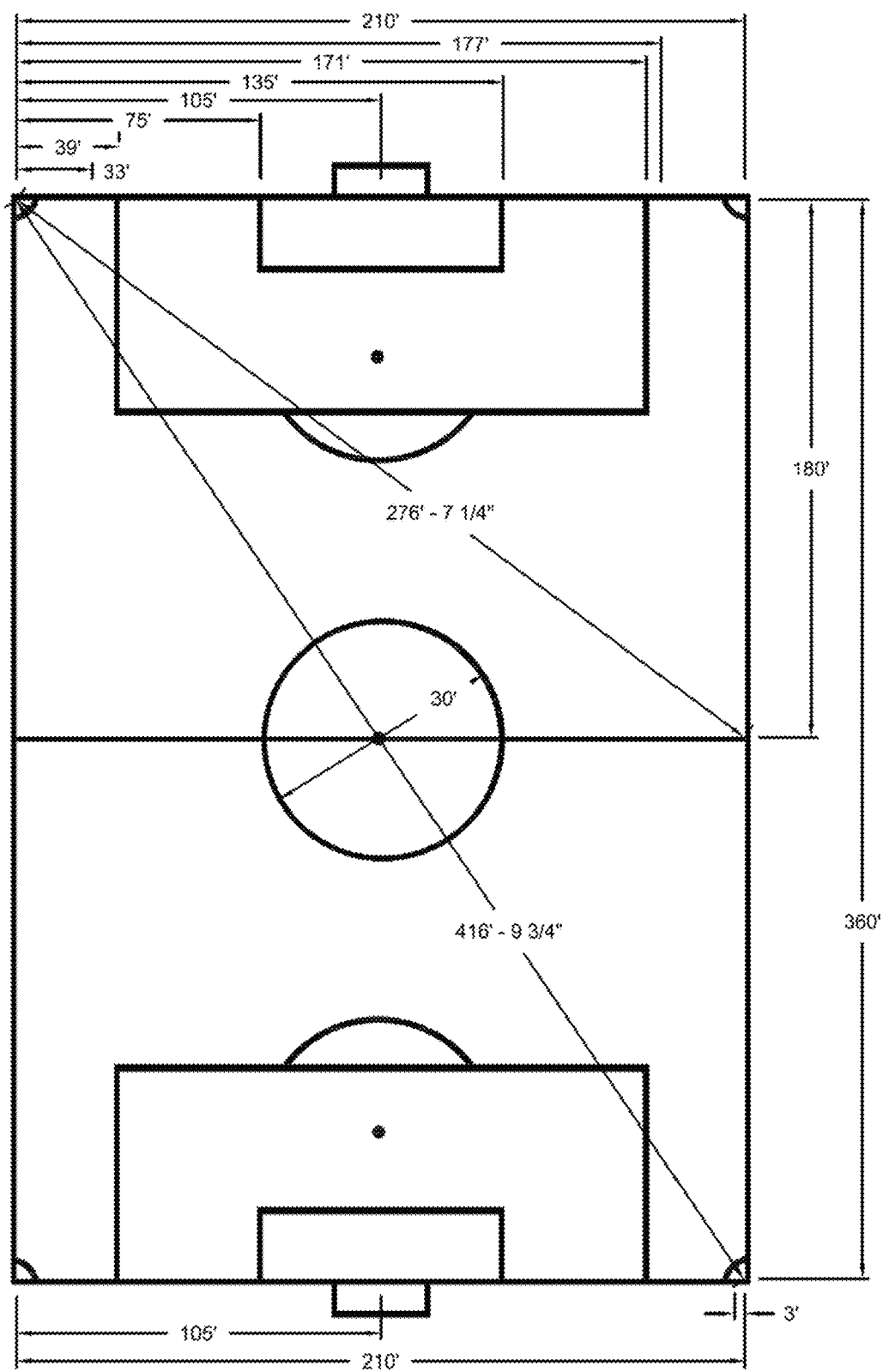
FIG. 5 is an illustration of a displayed field on a user's mobile device.

In an embodiment, FIG. 5 is an illustration of a displayed field on a user's mobile device. In one embodiment, the displayed field is shown as a soccer field with the appropriate dimensions labeled on the field.

In an embodiment, the user may specify custom field dimensions in addition to the sports field dimensions provided within the app. In an embodiment, a user may be able to share custom field dimensions with other users of the application. Each user has access to his/her own custom field dimension.

Each satellite in a GNSS/GPS constellation, emits a periodic atomic clock-based coded signal with a time stamp that can be used to determine location by determining the delay between the time the signal was sent and the time the signal was received. The signals travel at the speed of light, but there is a delay because the satellites are high above the Earth. The coded signal contains data for use, by a receiver, in computing the distance (range) from the receiver to the satellite. The GNSS/GPS receiver can compute its own three-dimensional position in conjunction with an atomic clock, synchronized to GPS, within the receiver, using range computations or, alternatively, methods using trilateration. A GPS signal received from a fourth satellite allows a GPS receiver system to use four satellites to compute longitude, latitude, altitude and time without resorting to use of an atomic clock.

Figure 6:
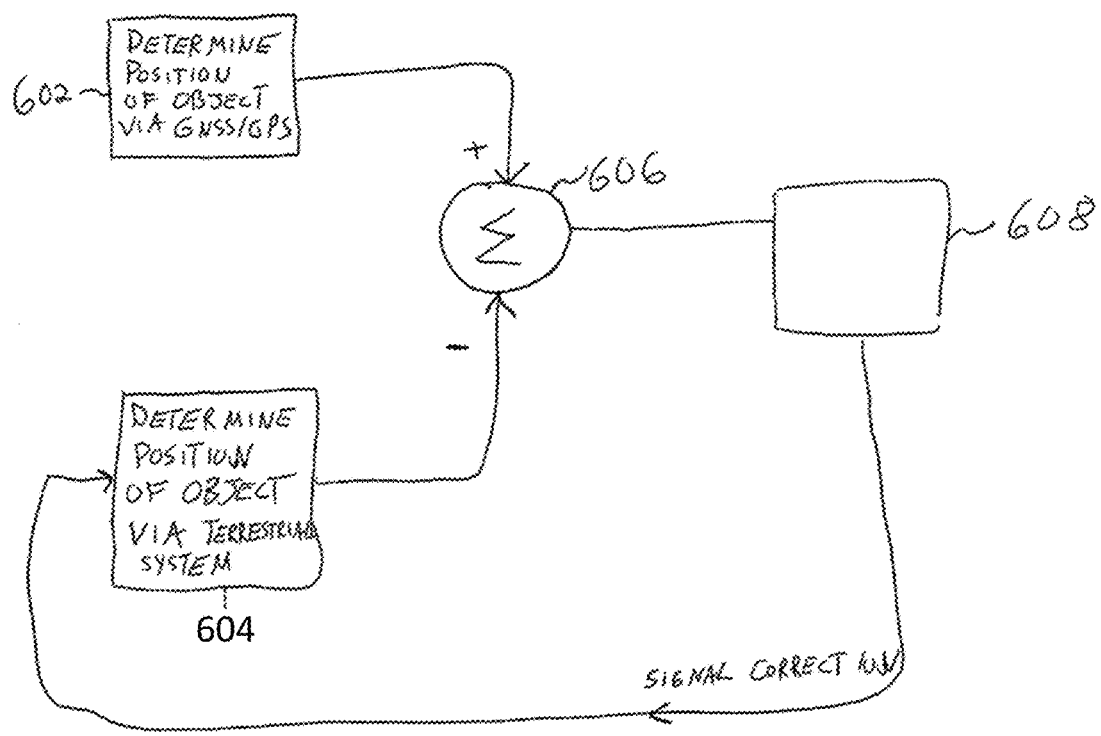
FIG. 6 illustrates a scheme which shows how the GNSS/GPS system may be used to improve the accuracy of a terrestrial navigation system.

In an alternate embodiment, a GNSS/GPS receiver data may supplement a terrestrial navigation system that may be used in conjunction with the foregoing to improve the accuracy of the field markings. The terrestrial system may include one or more gyroscopes, accelerometers, pedometers, magnetometers, multi-axis compasses and a combination thereof. The terrestrial system may be implemented within the mobile device itself or it may be carried by the user, attached to user or attached to a marking apparatus such as the marking wand or striping device. The GNSS/GPS timing signals emanating from the GNSS/GPS satellites may supplement terrestrial readings supplied by the terrestrial navigation system. For instance, for the case of a magnetometer, which points to due North, the reading for due North according to the magnetometer may differ from the reading for due North according to the GNSS/GPS calculations. FIG. 6 illustrates a scheme which shows how the GNSS/GPS system may be used to improve the accuracy of a terrestrial navigation system. In block 602 a determination of the position of an object is made using a GNSS/GPS receiver. In block 604 the position of the same object is made using a terrestrial navigation system. The difference in position between the two methods is determined by subtracting one reading from another through summing unit 606 and calculating an error signal at unit 608. An error signal used to produce a correction to the terrestrial navigation system is fed back to terrestrial navigation system to improve the accuracy of the terrestrial navigation system in position determinations. Thusly, with the GNSS/GPS satellite signals as the reference, the RFS application may correct its reading accordingly by the accuracy error noted. A similar approach may be used in the case of a terrestrial navigation system relying on one or more gyroscopes or compasses.

Figure 7:
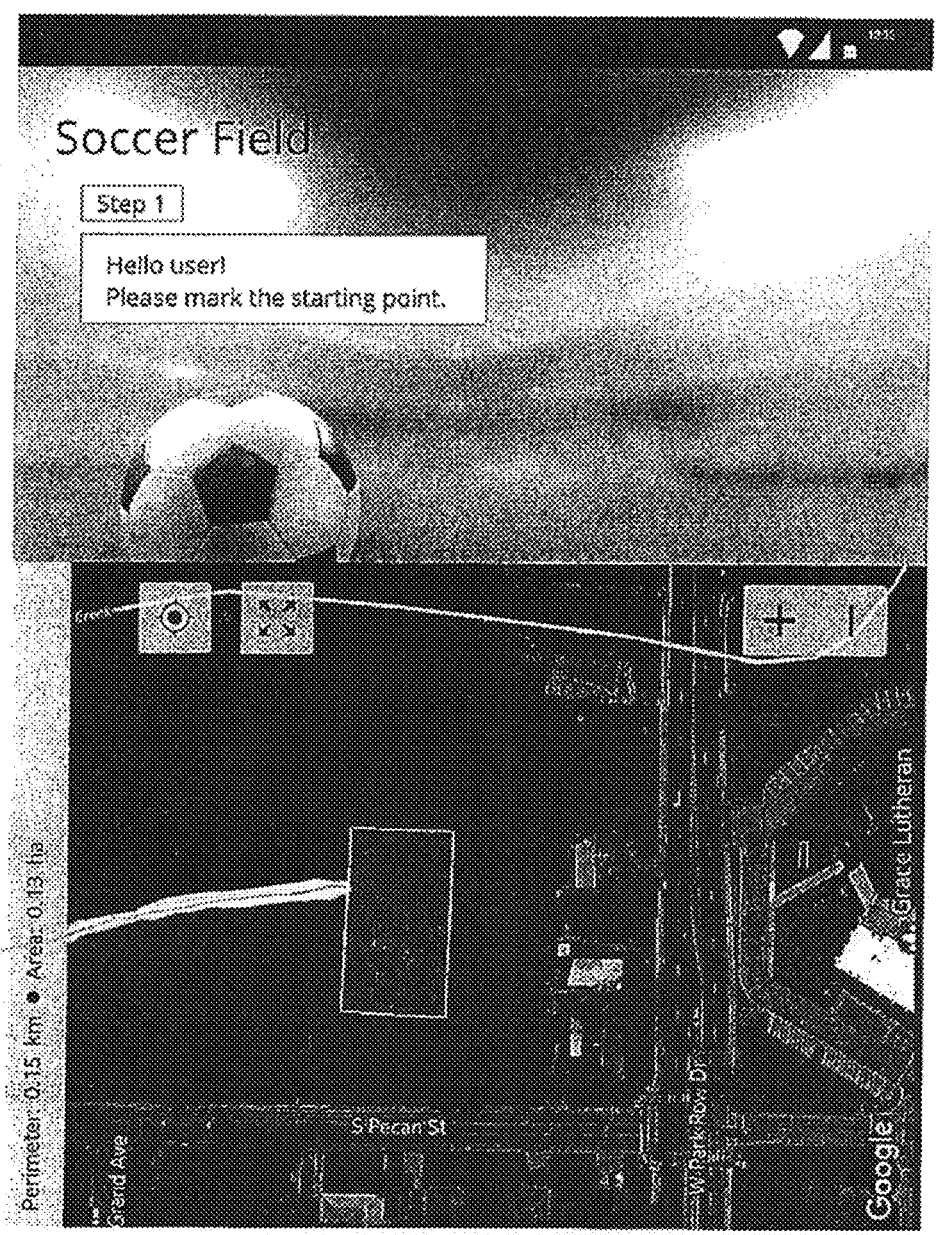
FIG. 7 illustrates a screenshot representation showing a field boundary superimposed on a satellite imagery map.
Figure 8:
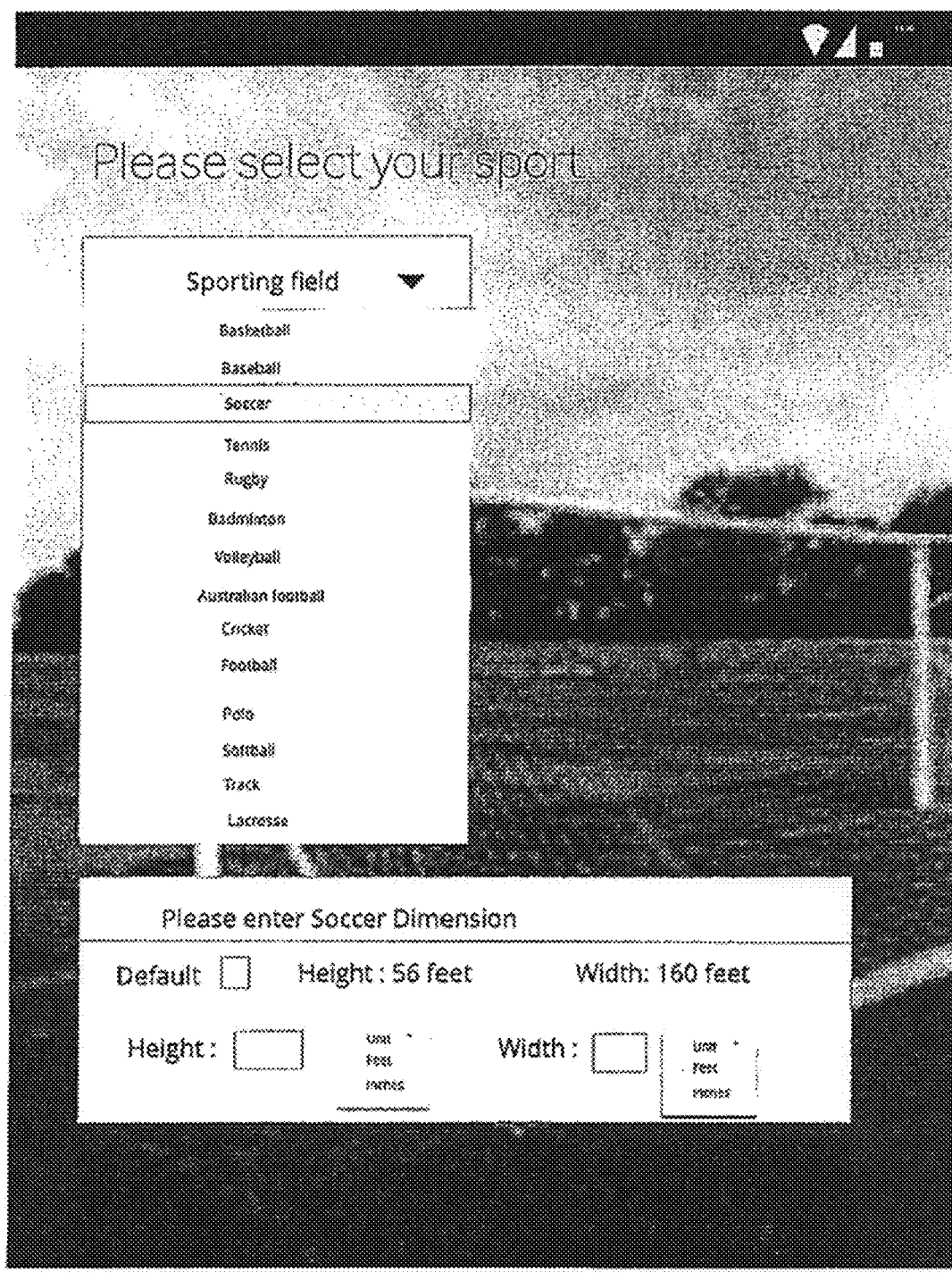
FIG. 8 illustrates a screenshot representation showing a pull-down menu of a sporting field selection screen.

Further screens of interest in facilitating line marking according the device, system and methods herein follow with respect to FIGS. 7 and 8.

FIG. 7 illustrates a screenshot representation showing field boundary 702 superimposed on a satellite imagery map. Boundary 702, in this example, is representative of a soccer field.

FIG. 8 illustrates a screenshot representation showing a pull-down menu of a sporting field selection screen. A soccer field selection is illustrated with an option to choose default dimension or to input custom dimensions.

The foregoing has been described herein using specific embodiments for the purposes of illustration only. It will be readily apparent to one of ordinary skill in the art, however, that the principles demonstrated herein may be embodied in other ways. Therefore, the invention should not be regarded as being limited in scope to the specific embodiments disclosed herein.

We claim:

1. A recreational field surveying and marking system comprising:
    a satellite system positioning receiver including navigation means;
    a processor;
    a field marking means;
    a graphical user display (GUI); and
    a computer-readable, non-transitory, programmable product including code for causing the processor to cause a recreational field layout with field markings to be shown on the GUI along with a map, generated in connection with the satellite system positioning receiver, indicating the position of a user, the code further causing the processor to indicate user travel movement deviations from the field markings.

2. The recreational field surveying and marking system as recited in claim 1 wherein the boundary marking means is hand operating marking wand.

3. The recreational field surveying and marking system as recited in claim 1 wherein the boundary marking means is a striping machine.

4. The recreational field surveying and marking system as recited in claim 1 wherein the satellite system positioning receiver, the processor and the GUI are implemented in a mobile communication device.

5. The recreational field surveying and marking system as recited in claim 4 wherein the mobile communication device is a communication device selected from devices consisting of a mobile phone, smart phone and tablet.

6. The recreational field surveying and marking system as recited in claim 1 wherein the navigation means is a navigation tool selected from a gyroscope, accelerometer, pedometer, magnetometer, multi-axis compass and combinations thereof.

7. The recreational field surveying and marking system as recited in claim 1 wherein the code further causes the processor to indicate user travel movement deviations from the field markings in connection with a user navigating along a path directed on the display in connection with the user operating the boundary marking means.

8. A recreational field surveying and marking system as recited in claim 1, further comprising:
    a terrestrial navigation system;
    wherein the computer-readable, non-transitory, programmable product further includes code for causing the processor to cause the recreational field layout with field markings to be shown on the GUI along with a map in conjunction with data supplied by the terrestrial navigation system and the satellite system positioning receiver.

9. A recreational field surveying and marking system as recited in claim 8 wherein the terrestrial navigation system is selected from a system consisting of a gyroscope, accelerometer, pedometer, magnetometer, multi-axis compasses and a combination thereof.

10. A recreational field surveying and marking system as recited in claim 4 wherein travel movement deviations are indicated by an audible warning capable of being generated by the mobile device.

11. A recreational field surveying and marking system as recited in claim 1 wherein travel movement deviations are indicated by a visible indication on the GUI.

12. A recreational field surveying and marking system as recited in claim 11 wherein travel movement deviations are represented by red arrows.

13. A recreational field surveying and marking system as recited in claim 12 wherein the code further causes the processor to generate a visual indication on the GUI of movement by a user according to a marking path generated by the processor.

14. The recreational field surveying and marking system as recited in claim 13 wherein the visual indication comprises a green arrow.

15. A computer-readable, non-transitory, programmable product including code for causing a processor to cause a recreational field layout with field markings to be shown on a display along with a map in conjunction with data supplied by a terrestrial navigation system and a satellite-based positioning system, the code further causing the processor to provide error correction in conjunction with comparing positioning determinations of the terrestrial navigation system and the satellite-based positioning system, the code further causing the processor to indicate user travel movement deviations from the field markings.

16. A computer-readable, non-transitory, programmable product as recited in claim 9 wherein the code further causes the processor to indicate user travel movement deviations from the field markings in connection with a user navigating along a path directed on the display in connection with a user operating a boundary marking means.

17. A method of recreational field marking comprising:
    providing, on a graphical user interface, a recreational field choice from a menu of recreational field choices;
    generating, in connection with a satellite system positioning receiver, a position of a user;
    displaying, a display map as generated by a satellite GNSS/GPS system receiver;
    displaying a recreational field layout according to the recreational field choice as an overlay on the display map;
    generating an indication in connection with a user deviating from a path determined by a processor in conjunction with data recited from the satellite system positioning receiver; and
    marking a field according to the path.

18. A method as recited in claim 17 further including displaying an indication showing adherence, during travel, to the path.

19. The method as recited in claim 17 wherein the indication is a visual warning.

20. The method as recited in claim 17 wherein the indication is an audible warning.

* * * * *